United States Patent [19]

Patrichi

[11] Patent Number: 4,488,977

[45] Date of Patent: Dec. 18, 1984

[54] HIGH TEMPERATURE SELF LUBRICATING BEARING

[75] Inventor: Mihai D. Patrichi, Los Angeles, Calif.

[73] Assignee: Networks Electronic Corp., Chatsworth, Calif.

[21] Appl. No.: 441,928

[22] Filed: Nov. 15, 1982

[51] Int. Cl.$^3$ .............................................. C10M 7/02
[52] U.S. Cl. ................... 252/12.4; 252/12.2; 252/12.6; 252/26
[58] Field of Search ............... 252/12, 12.2, 12.4, 252/12.6, 26

[56] References Cited

U.S. PATENT DOCUMENTS 3,199,934 8/1965 Van Wyk ........................... 252/26
3,755,164 8/1973 Van Wyk ........................... 252/12
3,941,903 3/1976 Tucker, Jr. ......................... 252/12
4,136,211 1/1979 Sliney ............................. 252/12.2

Primary Examiner—Jacqueline V. Howard
Attorney, Agent, or Firm—Munson H. Lane, Jr.

[57] ABSTRACT

The invention utilizes the ductility of a metal such as gold or silver or other suitably ductile metal having a relatively high fusion temperature, for self-lubrication of a bearing having a coating including exceedingly small particles of such metal in a mixture with load-bearing particles, also exceedingly small, such as tungsten or nickel or a metallic oxide in a coating on a load-bearing surface of such bearing.

The invention contemplates not only such a bearing surface but also a method of producing such surface on one element of a bearing.

8 Claims, 3 Drawing Figures

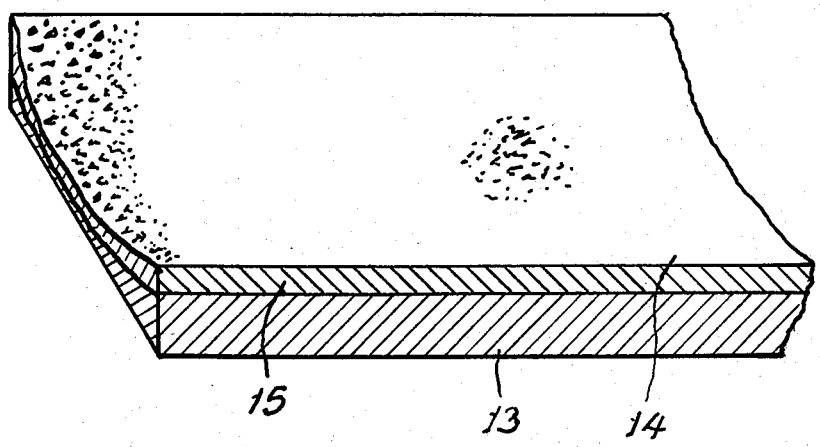
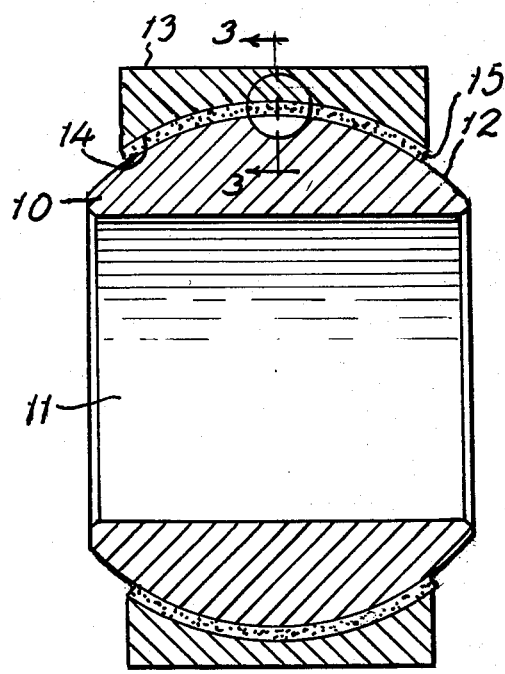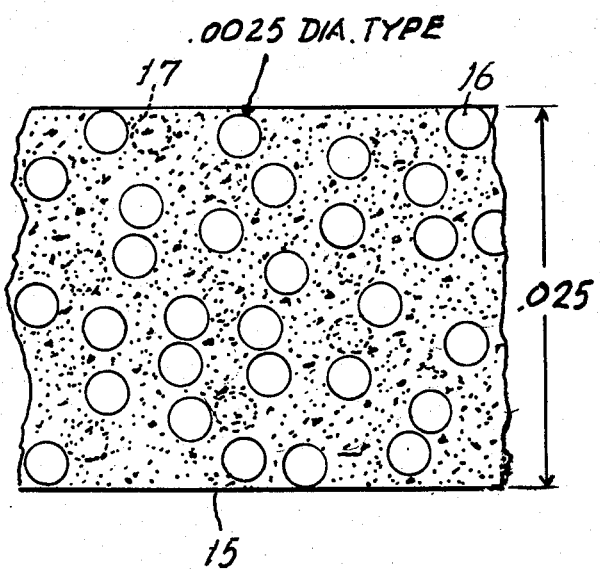

HIGH TEMPERATURE SELF LUBRICATING BEARING

BACKGROUND OF THE INVENTION

The prior art, insofar as I am aware, includes the following prior U.S. Pat. Nos. 2,989,352, Schmidt, June 20, 1961; 4,309,474, Hodes, Jan. 5, 1982; 4,309,064, Fukuoka, Jan. 5, 1982; 2,885,248, White, May 5, 1959; 3,206,264, Dalzell, Sept. 14, 1965; 3,112,115, Smith, Nov. 26, 1963; 3,081,196, MacDonald, Mar. 12, 1963; 2,609,256, Baker et al, Sept. 2, 1952; 1,285,689, Handel, Nov. 26, 1918; 2,246,092, Gilman, June 17, 1941.

RESUME' OF THE INVENTION

The invention provides a self lubricating bearing having high load bearing characteristics, with a bearing surface comprising a mixture of relatively ductile material for the load supporting function. The invention also provides a method of producing such a bearing surface on one or both elements of a bearing.

IN THE DRAWINGS

FIG. 1 illustrates a cross section of a spherical bearing embodying the invention, wherein oscillation of the male element within the female element is enhanced by the bearing coating of the invention, with long-life characteristics;

FIG. 2 is a cross sectional view of a section of the female bearing element on an extremely highly magnified scale, showing the bearing surface thereof according to the invention; and FIG. 3 is a cross sectional view of a small portion of the bearing, illustrated on a highly magnified scale.

DETAILED DESCRIPTION OF THE INVENTION

Referring now to the drawing, in FIG. 1 I have shown a spherical bearing such as a ball joint, comprising a male element 10 having a cylindrical bore 11 for reception of a shaft which is not shown; having a male bearing surface 12 of segmental spherical form; a female element 13 in the shape of a ring having an internal bearing surface 14 of segmental spherical form conforming to the contour of male bearing surface 12 but of very slightly larger diameter, and an intervening bearing coating 15 embodying the present invention. Coating 15 is preferably applied to the internal bearing surface 14.

Coating 15 comprises a mixture of ductile self-lubricating particles 16 (FIG. 3) and load bearing particles 17 which are intermixed with particles 16. Particles 16 are preferably of gold, for maximum self lubricating characteristics, but may also be of silver or other ductile metal of relatively high fusion temperature. The ductile metal, in extremely finely powdered form (as small as 0.8 micron size or smaller) is mixed as an emulsion with particles of load bearing metal or metals or metallic oxides (also of extremely finely powdered form, as small as 0.8 microns) such as tungsten or nickel, and with a chemical such as Polyimide Resin, to form a viscous emulsion which is then coated onto a clean, virgin surface. The coating process may be spraying, brushing or dipping. The coating is preferably applied to the concave surface of female bearing element 13, as indicated in FIG. 2, although the invention is to be understood as not being so restricted. Self lubricating particles 16 are intimately mixed with load bearing particles 17.

THE METHOD

In formulating the coating 15, the particles 16 and 17 are reduced to finely powdered form by grinding or other reduction processes and are then mixed with a liquid chemical such as Polyimide Resin to form a viscous emulsion which is then coated onto a virgin clean surface of a bearing element. After the liquid chemical has evaporated away, the coating on the bearing element will be cured in an oven at a selected temperature in the range of 850°.

The harder materials (tungsten, nickel etc) form a nucleus around which the lubricating material (gold, silver etc) will agglomerate. In this manner the harder materials will support the loads while relative movement between the bearing elements will be lubricated by the smearing action of the ductile material.

An alternative method of applying the high temperature lubricating material is as follows:

1. Sand blast the bearing components to remove contaminating materials and to increase the area for bonding.
2. Apply a high temperature adhesive such as a polimide adhesive, but not limited to the same, to the sand-blasted surface. Apply the same high temperature adhesive to a high temperature fabric such as, but not limited to, ceramic fiber fabric or glass fiber fabric. The amount of adhesive on the fabric should be held to a minimum to provide remaining space which will be taken by the high temperature lubricating coating.
3. Bond the fabric to the prepared bearing component. Cure the adhesive typically at +300° F., then at typically +525° F.
4. Dip the bonded bearing component and fabric in the high temperature self-lubricating material. Dry and cure at a temperature of typically +700° F.
5. Repeat operation 4 as required until the fabric is fully saturated and the desired thickness is achieved.
6. Complete the bearing assembly using standard techniques.

I claim as my invention:

1. A self lubricating bearing comprising male and female members;
    and a coating of lubricating material on the bearing surface of at least one of said members, said coating comprising a mixture of finely powdered metals in polyimide resin, said metals comprising a ductile metal and a wear resistant load bearing metal, said ductile metal comprising gold or silver, said load bearing metal comprising tungsten or nickel, said powdered metals being in the form of particles of 0.8 micron size or smaller, wherein said powdered metals being mixed in said resin in such quantities to have said load bearing metal form a nucleus around which said ductile metal will agglomerate, said coating being applied and cured at high temperature.
2. A self-lubricating bushing comprising a sleeve-type journal and a coating of lubricating material on the outer diameter or on the inner diameter or on both, said coating comprising a mixture of finely powdered metals in polyimide resin, said metals comprising a ductile metal and a wear resistant load bearing metal, said ductile metal comprising gold or silver, said load bearing metal comprising tungsten or nickel, said powdered metals being in the form of particles of 0.8 micron size or smaller, wherein said powdered metals being mixed in said resin in such quantities to have said load bearing metal form a nucleus around which said ductile metal will agglomerate, said coating being applied and cured at high temperature.

3. A self-lubricating rod end or link bearing comprising male and female members and a coating of self-lubricating material on the bearing surface of one of said members, said coating comprising a mixture of finely powdered metals in polyimide resin, said metals comprising a ductile metal and a wear resistant load bearing metal, said ductile metal comprising gold or silver, said load bearing metal comprising tungsten or nickel, said powdered metals being in the form of particles of 0.8 micron size or smaller, wherein said powdered metals being mixed in said resin in such quantities to have said load bearing metal form a nucleus around which said ductile metal will agglormerate, said coating being applied and cured at high temperature.

4. A slideable bearing device such as a thrust bearing plate having a coating of lubricating material on its bearing surface, said coating comprising a mixture of finely powdered metals in polyimide resin, said metals comprising a ductile metal and a wear resistant load bearing metal, said ductile metal comprising gold or silver, said load bearing metal comprising tungsten or nickel, said powdered metals being in the form of particles of 0.8 micron size or smaller, wherein said powdered metals being mixed in said resin in such quantities to have said load bearing metal form a nucleus around which said ductile metal will agglomerate, said coating being applied and cured at high temperature.

5. A bearing as defined in claim 1, wherein said coating is applied to the female race of said bearing.

6. A bearing as defined in claim 1, wherein said ductile and wear resistant materials are supported by their saturation into a high temperature fabric.

7. A bearing as defined in claim 6, wherein the high temperature fabric comprises ceramic fiber fabric or glass fiber fabric.

8. A bearing material defined in claim 7 wherein said wear resistant material is tungsten.

* * * * *